United States Patent
Ishii

(10) Patent No.: US 9,374,489 B2
(45) Date of Patent: Jun. 21, 2016

(54) IMAGE FORMING APPARATUS CAPABLE OF SETTING INITIAL DISPLAY SCREEN, METHOD OF CONTROLLING THE SAME, AND STORAGE MEDIUM

(71) Applicant: CANON KABUSHIKI KAISHA, Tokyo (JP)

(72) Inventor: Yoko Ishii, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/497,724

(22) Filed: Sep. 26, 2014

(65) Prior Publication Data

US 2015/0092235 A1    Apr. 2, 2015

(30) Foreign Application Priority Data

Oct. 1, 2013   (JP) ................................. 2013-206277

(51) Int. Cl.
*G06K 15/00* (2006.01)
*G06F 3/12* (2006.01)
*H04N 1/00* (2006.01)

(52) U.S. Cl.
CPC ......... *H04N 1/0097* (2013.01); *H04N 1/00509* (2013.01); *H04N 1/00928* (2013.01); *H04N 1/00962* (2013.01)

(58) Field of Classification Search
None
See application file for complete search history.

(56) References Cited

U.S. PATENT DOCUMENTS

| 8,166,542 B2 * | 4/2012 | Uno | G06Q 30/0601 358/1.14 |
| 8,405,855 B2 * | 3/2013 | Asakawa | H04N 1/00408 358/1.15 |
| 2012/0268768 A1 * | 10/2012 | Nakashima | G06F 21/608 358/1.13 |

FOREIGN PATENT DOCUMENTS

| JP | 2000231309 A | 8/2000 |
| JP | 2008273126 A | 11/2008 |

* cited by examiner

*Primary Examiner* — Marcus T Riley
(74) *Attorney, Agent, or Firm* — Rossi, Kimms & McDowell LLP

(57) ABSTRACT

An image forming apparatus equipped with a customization function and a resume function, which is capable of enabling a user to select one of these functions and thereby displaying an initial display screen intended by the user. A user is prompted to make a selection as to whether to display a user-customized screen or to display a screen displayed at logout time, as an initial screen to be displayed after start or reactivation of the image forming apparatus. The display of the initial screen after the start or reactivation of the image forming apparatus is controlled based on the selection made by the user.

10 Claims, 9 Drawing Sheets

IMAGE FORMING APPARATUS CAPABLE OF SETTING INITIAL DISPLAY SCREEN, METHOD OF CONTROLLING THE SAME, AND STORAGE MEDIUM

BACKGROUND OF THE INVENTION

1. Field of the Invention

The present invention relates to an image forming apparatus, a method of controlling the same, and a storage medium, and more particularly to an image forming apparatus that is capable of displaying an initial display screen intended by a user, a method of controlling the same, and a storage medium.

2. Description of the Related Art

In recent years, the shared use of one image forming apparatus by a plurality of users has become common, and there has been proposed an image forming apparatus equipped with a customization function for enabling each user to customize a screen according to settings specific to the user and displaying the customized screen as an initial display screen for the user (see e.g. Japanese Patent Laid-Open Publication No. 2000-231309).

However, each user is required to make customization settings by himself/herself, and hence it is difficult for a user unfamiliar with the image forming apparatus to make the customization settings per se. To cope with this, there has been proposed an image forming apparatus further equipped with a resume function for displaying, as the initial display screen, a screen associated with one of a plurality of functions selected by each user to perform an operation, which one function was used in the first place out of the plurality of selected functions (see e.g. Japanese Patent Laid-Open Publication No. 2008-273126).

However, the image forming apparatus equipped with the customization function and the resume function has a problem that the initial display screen displayed by either of the two functions, which is preferentially executed, is not necessarily the initial display screen intended by the user.

SUMMARY OF THE INVENTION

The present invention provides an image forming apparatus equipped with the customization function and the resume function, which is capable of enabling a user to select one of these functions and thereby displaying an initial display screen intended by the user, a method of controlling the same, and a storage medium.

In a first aspect of the present invention, there is provided an image forming apparatus comprising a selection unit configured to prompt a user to make a selection as to whether to display a user-customized screen, or to display a screen displayed at logout time, as an initial screen to be displayed after start or reactivation of the image forming apparatus, and a control unit configured to control display of the initial screen after the start or reactivation of the image forming apparatus, based on the selection made by the user in response to prompting by the selection unit.

In a second aspect of the present invention, there is provided a method of controlling an image forming apparatus comprising prompting a user to make a selection as to whether to display a user-customized screen, or to display a screen displayed at logout time, as an initial screen to be displayed after start or reactivation of the image forming apparatus, and controlling display of the initial screen after the start or reactivation of the image forming apparatus, based on the selection made by the user in response to said prompting.

In a third aspect of the present invention, there is provided a non-transitory computer-readable storage medium storing a computer-executable program for executing a method of controlling an image forming apparatus, wherein the method comprises prompting a user to make a selection as to whether to display a user-customized screen, or to display a screen displayed at logout time, as an initial screen to be displayed after start or reactivation of the image forming apparatus, and controlling display of the initial screen after the start or reactivation of the image forming apparatus, based on the selection made by the user in response to said prompting.

According to the present invention, the image forming apparatus equipped with the customization function and the resume function enables the user to select one of these functions, and hence it is possible to display the initial display screen intended by the user.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
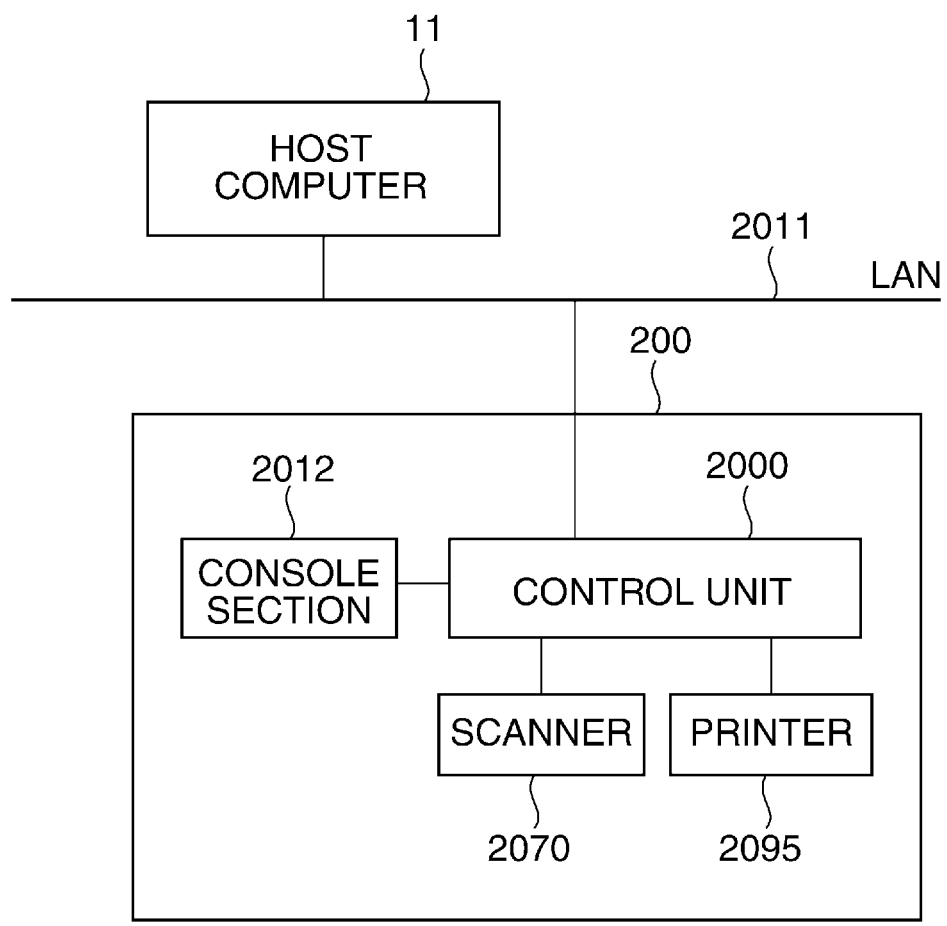
FIG. 1 is a schematic block diagram of an image output system including an image forming apparatus according to an embodiment of the present invention.

FIG. 1 is a schematic block diagram of an image output system including an image forming apparatus according to an embodiment of the present invention.

The image output system shown in FIG. 1 is comprised of a host computer 11 and an image forming apparatus 200, which are connected to each other via a LAN 2011. The image forming apparatus 200 includes a scanner 2070, a printer 2095, a control unit 2000, and a console section 2012, and the control unit 2000 is connected to the LAN 2011. The image forming apparatus 200 functions as a print server that provides services, such as a print service and a scan service, to computers connected via a network.

The host computer 11 is an information processing apparatus that functions as a client computer in relation to the image forming apparatus 200 which functions as the print server, and includes a display device, a keyboard, a pointing device, and a computer main unit (none of which are shown). The computer main unit incorporating a RAM and a storage device, neither of which is shown, loads an operating system (OS) stored in the storage device into the RAM, and executes the OS. Further, the computer main unit loads application programs similarly stored in the storage device into the RAM, and executes the programs.

Figure 2:
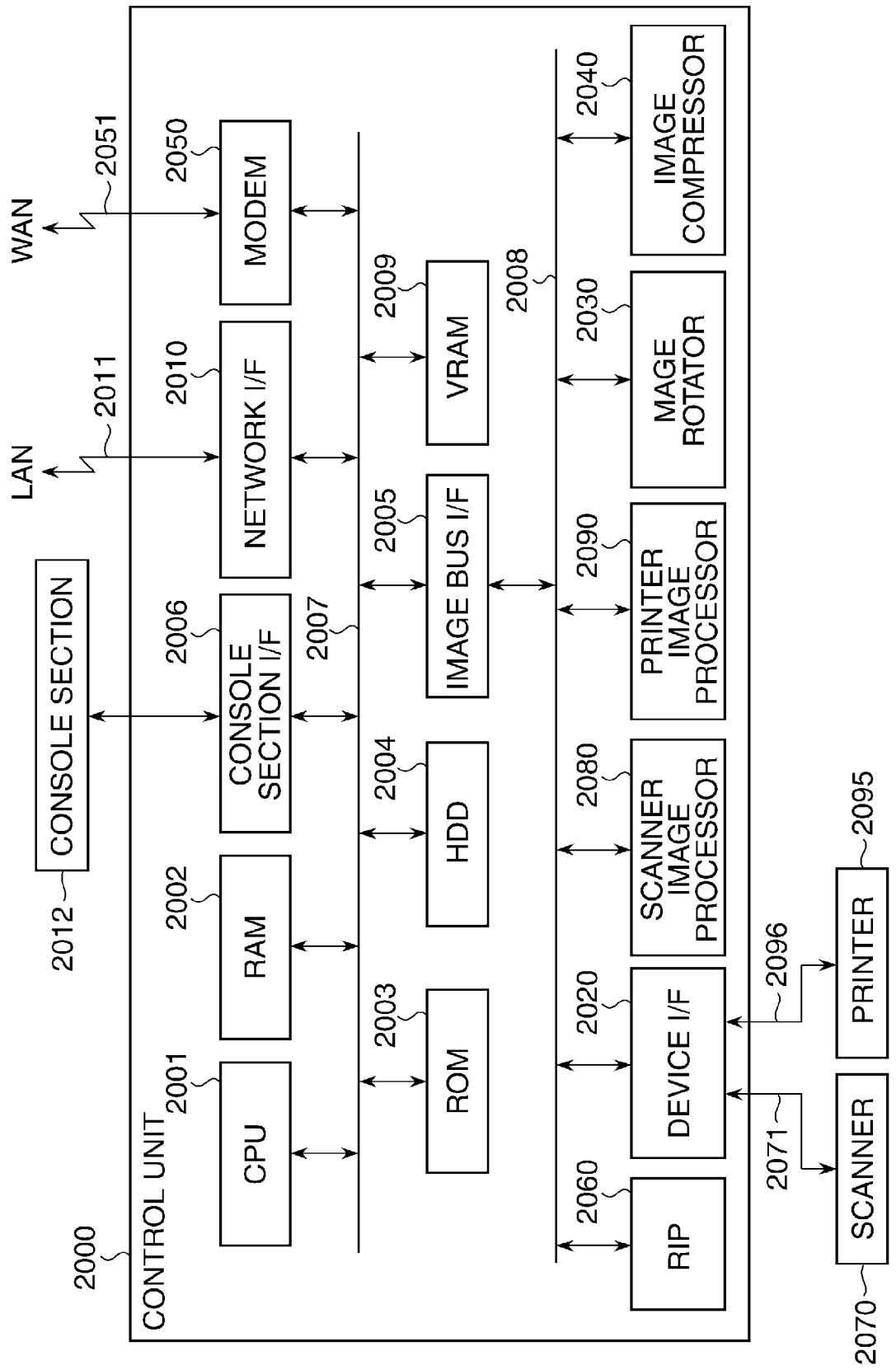
FIG. 2 is a block diagram of the internal arrangement of a control unit appearing in FIG. 1.

FIG. 2 is a block diagram of the internal arrangement of the control unit 2000 appearing in FIG. 1.

Referring to FIG. 2, the control unit 2000 includes a CPU 2001, a RAM 2002, a ROM 2003, an HDD (hard disk drive) 2004, an image bus interface 2005, a console section interface 2006, a system bus 2007, a VRAM 2009, a network interface 2010, and a modem 2050, which are connected to each other via the system bus 2007. The control unit 2000 further includes a device interface 2020, an image rotator 2030, an image compressor 2040, a RIP (raster image processor) 2060, a scanner image processor 2080, and a printer image processor 2090, and these components and the image bus interface 2005 are connected to each other via an image bus 2008.

The console section interface 2006, the network interface 2010, and the modem 2050 are connected to the console section 2012, the LAN 2011, and a WAN (wide area network) 2051, respectively. Further, the device interface 2020 is connected to the scanner 2070 and the printer 2095.

The CPU 2001 controls the overall operation of the system, and executes processing according to programs loaded into the RAM 2002. The RAM 2002 is used as a system work memory for the operation of the CPU 2001, and also functions as an image memory for temporarily storing image data. The ROM 2003 is a boot ROM that stores a boot program for the system.

The HDD 2004 stores system software, such as the operating system and the application programs, image data, and so forth. The image bus interface 2005 is a bus bridge for connecting the system bus 2007 and the image bus 2008 to each other, and is connected to the other devices connected thereto via the system bus 2007 and the image bus 2008. The console section interface 2006 connects the console section 2012 and the system bus 2007 to each other, and connects between the other devices connected via the system bus 2007 and the console section 2012.

The image bus 2008 is implemented by a PCI bus or an IEEE 1394 bus, and is capable of transferring image data at high data transfer rate. The VRAM 2009 stores image data created based on display data acquired by the CPU 2001 from the HDD 2004. The network interface 2010 connects the LAN 2011 and the system bus 2007 to each other, and is connected to the other devices connected thereto via the system bus 2007. The modem 2050 connects the WAN 2051 and the system bus 2007 to each other, and connects between the other devices connected thereto via the system bus 2007 and the WAN 2051.

The device interface 2020 connects the scanner 2070 connected thereto via an image input section interface 2071 and the printer 2095 connected thereto via a print section interface 2096, to the image bus 2008, and connects the other devices connected thereto via the image bus 2008 to the scanner 2070 and the printer 2095. Particularly, the device interface 2020 is connected to the CPU 2001 to perform synchronous-to-asynchronous or asynchronous-to-synchronous conversion of image data. The image rotator 2030 performs processing for rotating image data. The image compressor 2040 performs JPEG compression and decompression on multi-valued image data, and JBIG, MMR, or MH-based compression and decompression on binary image data.

The RIP 2060 converts a PDL code to a bitmap image. The scanner 2070 includes a platen and an automatic document feeder (ADF), and optically reads an original placed on the platen or the ADF when an original reading start button (not shown) of the console section 2012 is pressed. The printer 2095 outputs image data and the like, and a user can make settings concerning the output of the printer 2095 on the console section 2012, including settings for page layout on a sheet, settings of processing, such as stapling, performed by a finisher, and settings of image quality, such as density.

The scanner image processor 2080 corrects, processes, and edits input image data. The printer image processor 2090 performs correction, resolution conversion, and other processing, on image data to be output to the printer.

Figure 3:
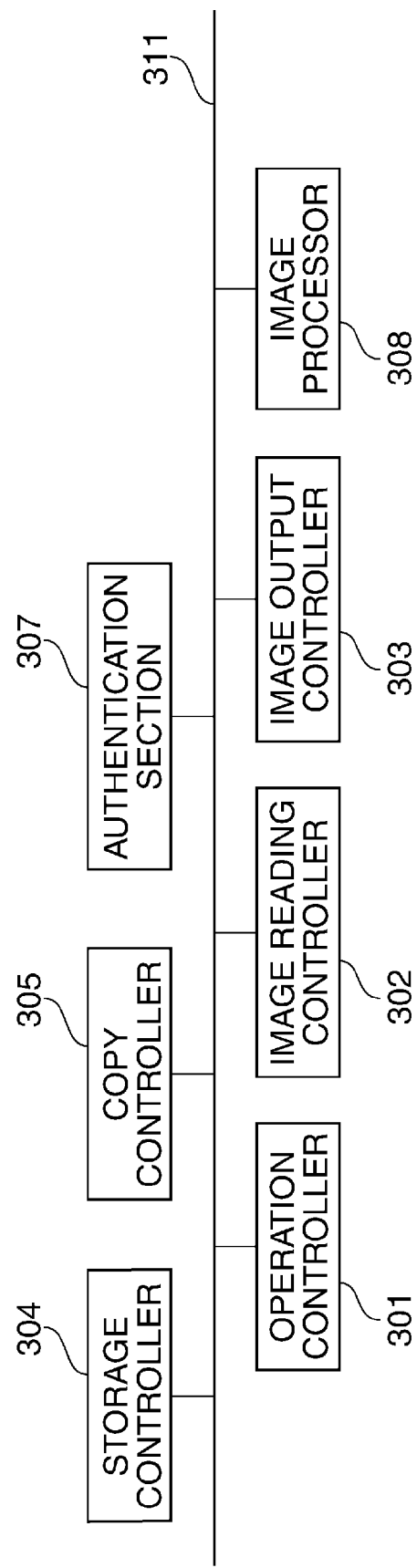
FIG. 3 is a block diagram showing blocks corresponding to functions realized by the operation of a CPU appearing in FIG. 2 based on system software.

FIG. 3 is a block diagram showing blocks corresponding to functions realized based on the above-mentioned system software, appearing in FIG. 2, by the operation of the CPU 2001.

Referring to FIG. 3, the function blocks which are realized by the operation of the CPU 2001 based on the system software are an operation controller 301, an image reading controller 302, an image output controller 303, a storage controller 304, a copy controller 305, an authentication section 307, and an image processor 308, which are associated with each other by a process calling function 311 of the system software which is executed using an internal bus of the hardware.

The operation controller 301 controls the console section 2012, generates a screen corresponding to contents of a request input by a user via the console section 2012, and instructs the console section 2012 to display the generated screen.

The image reading controller 302 controls the scanner 2070, and stores image data read by the scanner 2070 in the RAM 2002 or the HDD 2004 via the storage controller 304. In doing this, the image reading controller 302 determines which of the RAM 2002 or the HDD 2004 is to store the image data read by the scanner 2070, base on e.g. data size or whether or not high-speed processing is required.

The image output controller 303 controls the printer 2095, acquires image data stored in the RAM 2002 or the HDD 2004 connected to the storage controller 304, and outputs the acquired image data to the printer 2095. The storage controller 304 controls the RAM 2002 and the HDD 2004, and causes image data of the original read by the image reading controller 302 and the like to be stored in the RAM 2002 or the HDD 2004. The copy controller 305 instructs the image reading controller 302 to read an original, and instructs the image output controller 303 to print image data stored in the RAM 2002 or the HDD 2004 connected to the storage controller 304.

The authentication section 307 can perform authentication of a user who uses the image forming apparatus 200. More specifically, the authentication section 307 performs authentication by verifying authentication information input via the console section 2012, such as a user name and a password, against a user database stored in the RAM 2002 or the HDD 2004 of the image forming apparatus 200. Alternatively, authentication may be performed by using a contactless IC card or an external authentication server (e.g. Active Directory). The image processor 308 edits image data for printout, and stores the edited image data in the RAM 2002 or the HDD 2004 via the storage controller 304.

Figure 4:
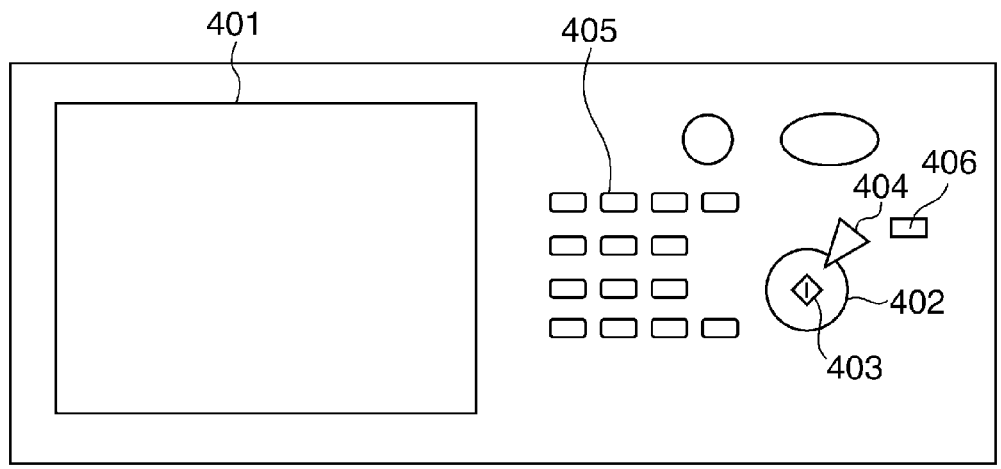
FIG. 4 is a schematic diagram of the appearance of a console section appearing in FIG. 2.

FIG. 4 is a schematic diagram of the appearance of the console section 2012 appearing in FIG. 2.

Referring to FIG. 4, the console section 2012 includes a liquid crystal display section 401, a start key 402, an LED 403, a stop key 404, a numeric keypad 405, and a user mode key 406.

The liquid crystal display section 401 is a liquid crystal display screen on which a touch panel can be operated, and the start key 402 is pressed e.g. when reading of an original image is started. The LED 403 is located in a central portion of the start key 402 and indicates whether or not the start key 402 can be operated by lighting either of two colors of green and red. The stop key 404 is pressed for stopping the active operation of the image forming apparatus 200. The numeric keypad 405 is formed by numerals and characters, and is used for designating the number of copies, and switching the screen of the liquid crystal display section 401. The user mode key 406 is pressed when device settings start to be made.

Figure 5:
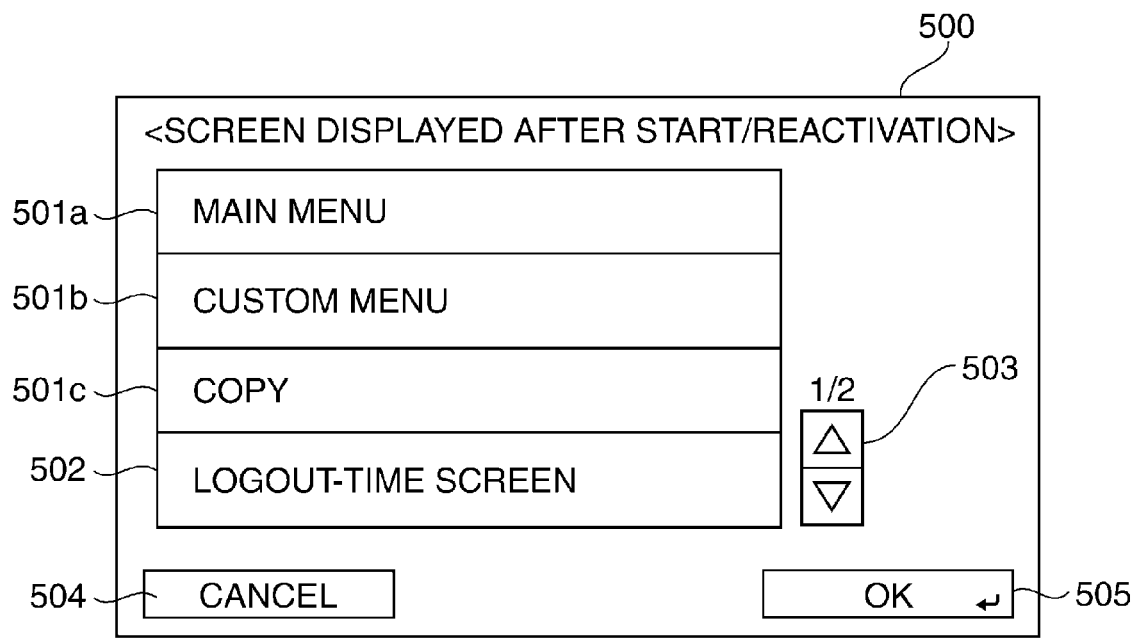
FIG. 5 is a diagram showing an initial display screen-setting dialog displayed on a liquid crystal display section appearing in FIG. 4.

FIG. 5 is a diagram showing an initial display screen-setting dialog 500 displayed on the liquid crystal display section 401 appearing in FIG. 4.

The initial display screen-setting dialog 500 shown in FIG. 5 is a screen used for performing an initial display screen-setting process in FIG. 6, described hereinafter, and is displayed on the liquid crystal display section 401 appearing in FIG. 4 after the start or reactivation of the image forming apparatus 200.

The initial display screen-setting dialog 500 includes a main menu button 501*a*, a custom menu button 501*b*, a copy button 501*c*, a logout-time screen button 502, a page shift key 503, a cancel button 504, and an OK button 505.

A user can select one of setting screens of "main menu", "custom menu", "copy menu", and "screen displayed at logout time" as a screen to be displayed after the start or reactivation of the image forming apparatus 200 by using the initial display screen-setting dialog 500. For example, when the main menu button 501*a* or the custom menu button 501*b* is selected, a main menu or a custom menu is set as the initial display screen. When the copy button 501*c* is selected, a copy menu for setting conditions for the copy operation is set as the initial display screen, and when the logout-time screen button 502 is selected, the screen being displayed on the liquid crystal display section 401 when the user logs out is set as the initial display screen.

The user of the image forming apparatus 200 can customize contents to be displayed as the initial display screen, for each of "main menu", "custom menu", and "copy menu", on an individual basis. Further, the setting screen of "screen displayed at logout time" is only shown as an example of an option to be displayed, and the option is not necessarily required to be the setting screen of "screen displayed at logout time" which is set to settings at the time of logout. For example, the option may be an option having another name and configured to display a screen which is associated with a timing desired by the user, for enabling the user to resume processing from the screen.

The page shift key 503 is a key used for viewing another page when buttons for selection of the initial display screen are displayed over a plurality of pages. The cancel button 504 is a button for canceling the setting selected on the initial display screen-setting dialog 500 and closing the initial display screen-setting dialog 500. The OK button 505 is a button for finalizing the selection of the setting selected on the initial display screen-setting dialog 500 and closing the initial display screen-setting dialog 500.

Note that the initial display screen-setting dialog 500 can be customized by each user of the image forming apparatus 200, on an individual user basis.

Figure 6:
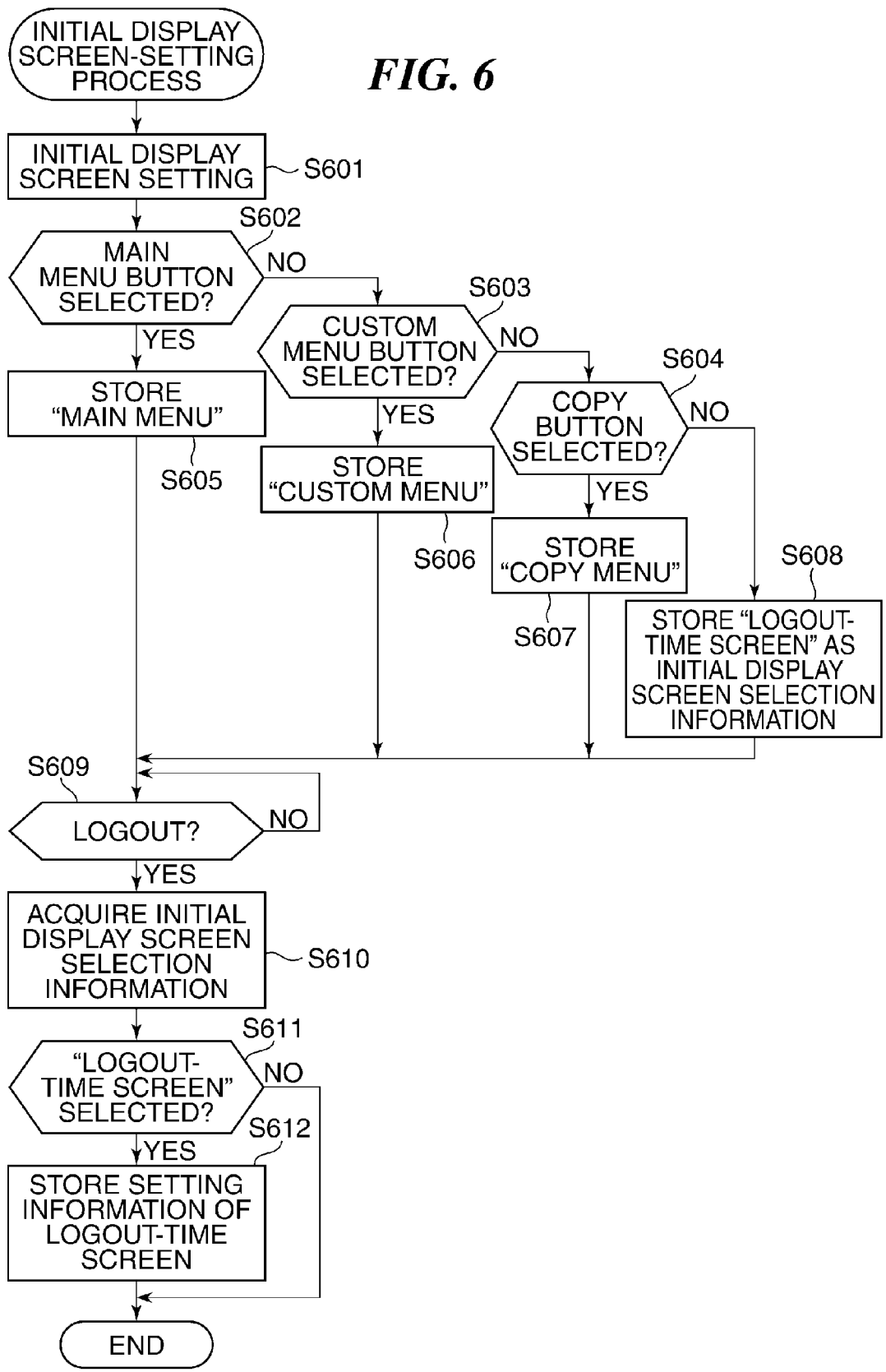
FIG. 6 is a flowchart of an initial display screen-setting process for setting an initial display screen using the initial display screen-setting dialog shown in FIG. 5.

FIG. 6 is a flowchart of the initial display screen-setting process for setting the initial display screen using the initial display screen-setting dialog 500 shown in FIG. 5.

The present process is executed by the CPU 2001 of the control unit 2000.

Referring to FIG. 6, first, the user of the image forming apparatus 200 starts initial display screen setting using the initial display screen-setting dialog 500 shown in FIG. 5 (step S601). Then, the CPU 2001 performs the following determinations: whether or not the main menu button 501*a* is selected (step S602), whether or not the custom menu button 501*b* is selected (step S603), and whether or not the copy button 501*c* is selected (step S604).

If it is determined in the step S602 that the main menu button 501*a* is selected, the CPU 2001 stores "main menu" in the HDD 2004 as initial display screen setting information (step S605). If it is determined in the step S603 that the custom menu button 501*b* is selected, the CPU 2001 stores "custom menu" in the HDD 2004 as the initial display screen setting information (step S606). If it is determined in the step S604 that the copy button 501*c* is selected, the CPU 2001 stores "copy menu" in the HDD 2004 as the initial display screen setting information (step S607).

If it is determined in the steps S602 to S604 that none of the main menu button 501*a*, the custom menu button 501*b*, and the copy button 501*c* are selected, but the logout-time screen button 502 is selected, the CPU 2001 selects "screen displayed at logout time" as the initial display screen, and stores the "screen displayed at logout time" in the HDD 2004 as initial display screen selection information (step S608).

In the following step S609, when "logout" for terminating the use of the image forming apparatus 200 is instructed (YES to the step S609), the CPU 2001 acquires the initial display screen selection information from the HDD 2004 (step S610), and determines whether or not the acquired initial display screen selection information is "screen displayed at logout time" (step S611).

If it is determined in the step S611 that the initial display screen selection information is "screen displayed at logout time", the CPU 2001 stores the screen being displayed on the liquid crystal display section 401 at logout time in the HDD 2004 as the initial display screen setting information (step S612), followed by terminating the present process. On the other hand, if it is determined in the step S611 that the initial display screen information is other than "screen displayed at logout time", the CPU 2001 skips the step S612, and immediately terminates the present process.

Figure 7:
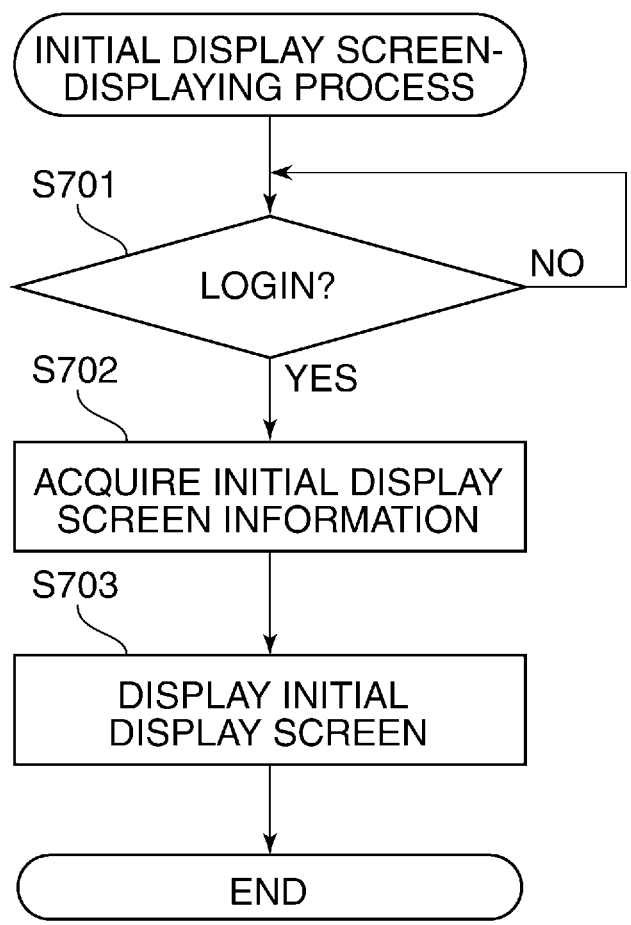
FIG. 7 is a flowchart of an initial display screen-displaying process for displaying the initial display screen set according to the initial display screen-setting process in FIG. 6.

FIG. 7 is a flowchart of an initial display screen-displaying process for displaying the initial display screen set by the initial display screen-setting process in FIG. 6.

Referring to FIG. 7, when the user logs in (YES to a step S701), the CPU 2001 acquires information concerning the initial display screen associated with the logged-in user and set by the initial display screen-setting process in FIG. 6, from the HDD 2004 (step S702), and displays the acquired information on the liquid crystal display section 401 (step S703), followed by terminating the present process.

According to the processes in FIGS. 6 and 7, when setting the initial display screen, one of the main menu button 501*a*, the custom menu button 501*b*, the copy button 501*c*, and the logout-time screen button 502 is pressed (step S601), whereby one of the setting screens of "main menu", "custom menu", "copy menu", and "screen displayed at logout time", associated with the pressed button, is set as the initial display screen (steps S602 to S604, and S608), and hence it is possible to display the initial display screen intended by the user, on the liquid crystal display section 401 (step S703).

Figure 8:
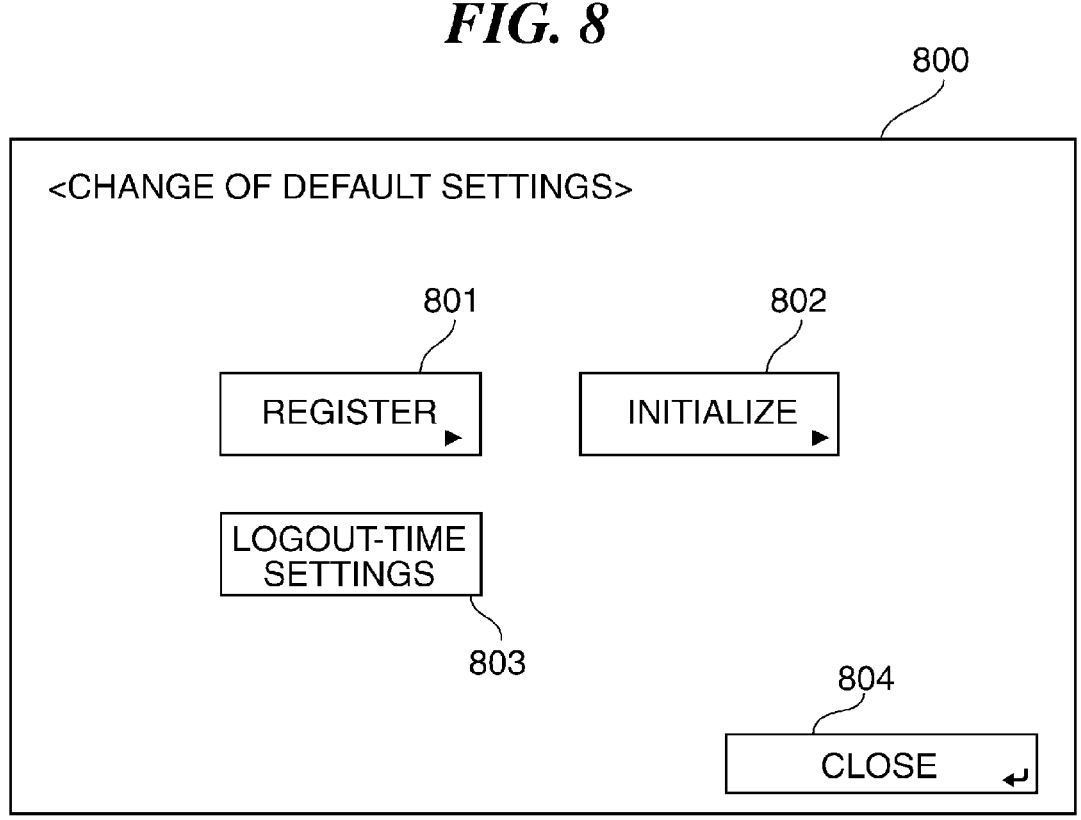
FIG. 8 is a diagram of a default settings-changing screen displayed on the liquid crystal display section appearing in FIG. 4.

FIG. 8 is a diagram of a default settings-changing screen 800 displayed on the liquid crystal display section 401 appearing in FIG. 4.

The default settings changing-screen 800 shown in FIG. 8 is a screen used for performing a default settings-changing process in FIG. 9, described hereinafter. Out of functions of the image forming apparatus 200 (hereinafter referred to as the "predetermined functions"), settings on a predetermined frequently executed one can be set by the user as default settings made and displayed on an initial display screen, whereby it is possible to save the user time and effort from having to make the same settings whenever the predetermined frequently executed function is executed.

The default settings-changing screen 800 shown in FIG. 8 includes a registration button 801, an initialization button 802, a logout-time setting button 803, and a close button 804.

When the registration button 801 is pressed, setting information of one of the aforementioned predetermined functions which has been selected and in use when the registration button 801 is pressed is stored in the HDD 2004, whereby settings of an initial display screen are registered. When the registration button 801 is pressed, a list of settings as contents of the setting information to be stored in the HDD 2004 at this time may be displayed to prompt the user to confirm the contents to be registered. When the initialization button 802 is pressed, factory default settings information is stored in the HDD 2004 as the setting information of a selected predetermined function. Note that the user of the image forming apparatus 200 can customize the setting information of each of the predetermined functions separately. Further, by associating registered setting information with authentication information, such as a user name and a password, the setting information becomes information customized on a user-by-user basis.

When the logout-time setting button 803 is pressed, the image forming apparatus 200 is configured such that when the user logs out, setting information of one of the predetermined functions which has been selected and been in use at logout time is stored in the HDD 2004. Also when the initialization button 802 is pressed, a list of settings as contents of the factory default settings information registered in the HDD 2004 may be displayed to prompt the user to confirm the registered contents, similarly to when the registration button 801 is pressed. When the close button 804 is pressed, the default settings-changing screen 800 is closed. Note that the default settings-changing screen 800 can be individually customized by each user.

Figure 9:
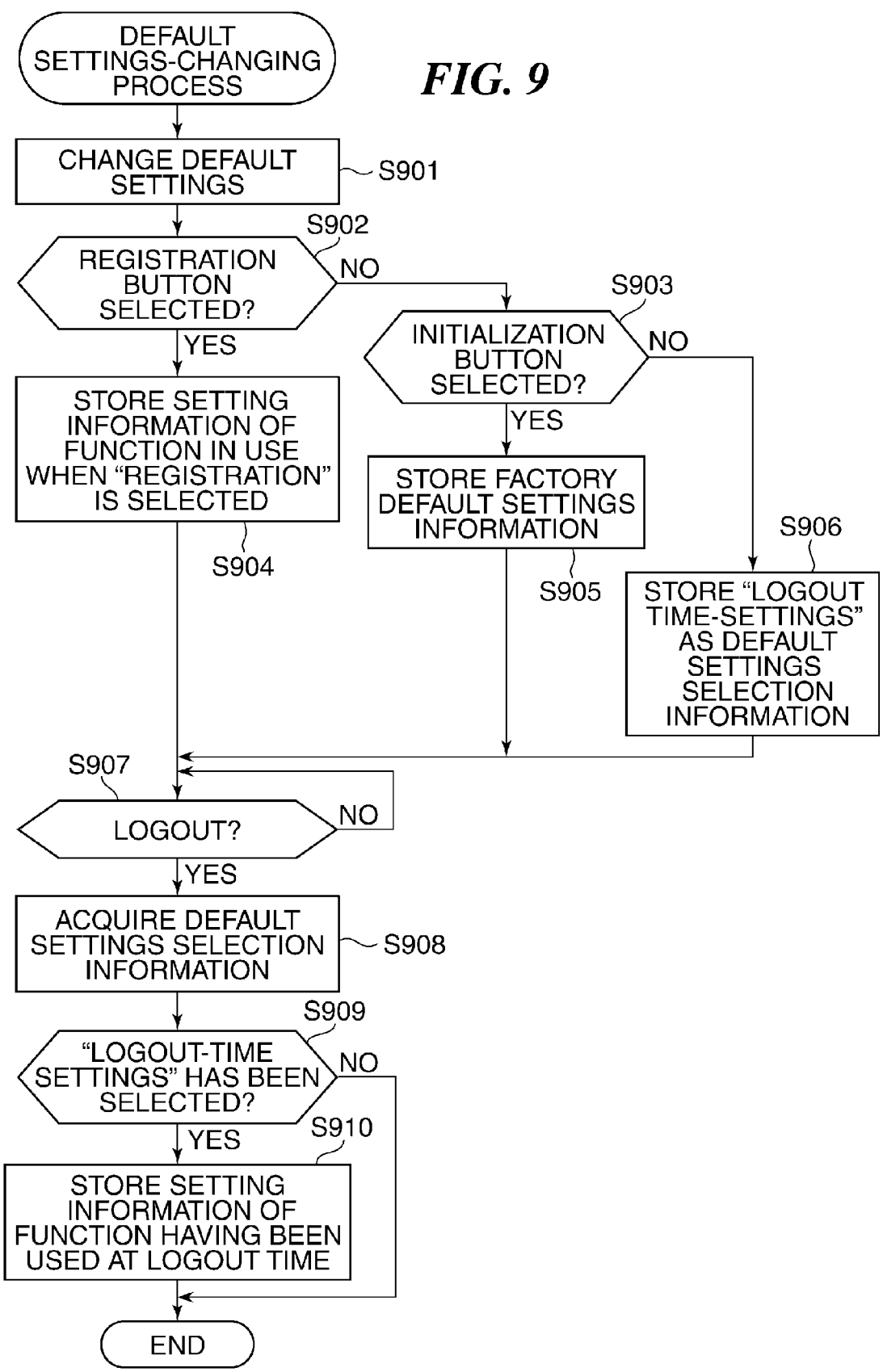
FIG. 9 is a flowchart of a default settings-changing process for changing default settings using the default settings-changing screen shown in FIG. 8.

FIG. 9 is a flowchart of the default settings-changing process for changing the default settings using the default settings-changing screen 800 shown in FIG. 8.

Referring to FIG. 9, first, the user of the image forming apparatus 200 starts the default settings change of the predetermined function using the default settings-changing screen 800 shown in FIG. 8 (step S901). Then, the CPU 2001 performs the following determinations: whether or not the registration button 801 is selected (step S902), and whether or not the initialization button 802 is selected (step S903).

If it is determined in the step S902 that the registration button 801 is selected, the CPU 2001 stores the setting information of the predetermined function associated with the registration button 801, in the HDD 2004 (step S904). If it is determined in the step S903 that the initialization button 802 is selected, the CPU 2001 stores the factory default settings information as the setting information of the selected predetermined function in the HDD 2004 (step S905).

If it is determined in the steps S902 to S905 that none of the registration button 801 and the initialization button 802 are selected, but the logout-time setting button 803 is selected, the CPU 2001 stores "logout-time settings" in the HDD 2004 as selection information of the default settings (the setting information of the selected predetermined function) (step S906).

In a step S907 following the step S906, if "logout" for terminating the use of the image forming apparatus 200 is instructed (YES to the step S907), the CPU 2001 acquires the selection information of the default settings from the HDD 2004 (step S908), and determines whether or not the selection information of the default settings is "logout-time settings" (step S909).

If it is determined in the step S909 that the selection information of the default settings is "logout-time settings", the CPU 2001 stores settings of a function having been used at the time (i.e. logout time) in the HDD 2004 as the setting information of the selected predetermined function (step S910), followed by terminating the present process. On the other hand, if it is determined in the step S909 that the selection information of the default settings is information other than "logout-time settings", the CPU 2001 skips the step S910, and immediately terminates the present process.

Figure 10:
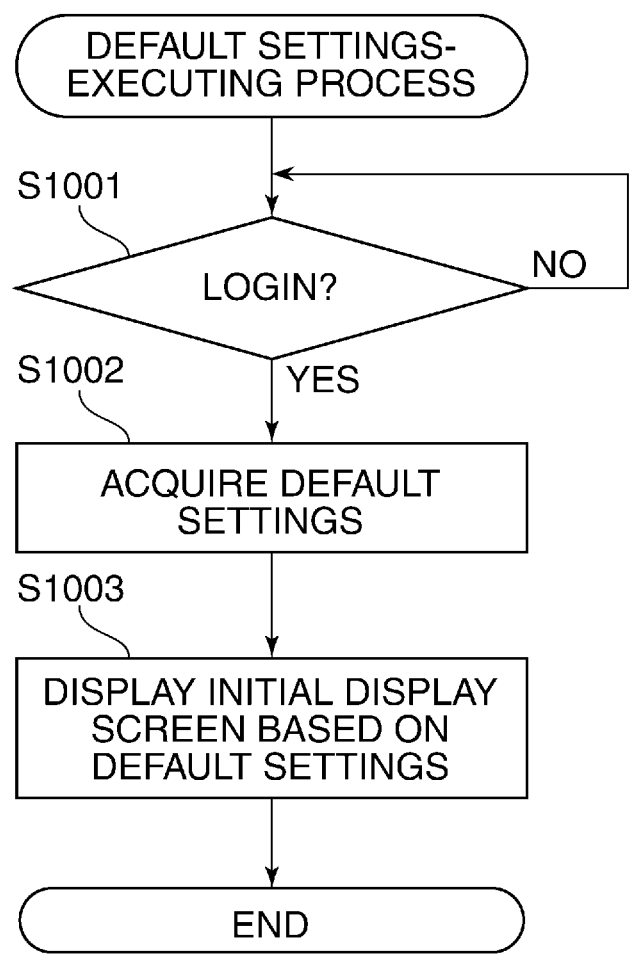
FIG. 10 is a flowchart of a default settings-executing process for executing the default settings changed according to the default settings-changing process in FIG. 9.

FIG. 10 is a flowchart of a default settings-executing process for executing the default settings changed according to the default settings-changing process in FIG. 9.

Referring to FIG. 10, when the user logs in (YES to a step S1001), the CPU 2001 acquires the information on the default settings (setting information of the selected predetermined function) associated with the logged-in user, which has been set by the default settings-changing process in FIG. 9, from the HDD 2004 (step S1002), and displays the initial display screen based on the acquired information on the liquid crystal display section 401 (step S1003), followed by terminating the present process.

According to the processes in FIGS. 9 and 10, one of the registration button 801, the initialization button 802, and the logout-time setting button 803 is pressed when changing the default settings (step S901), and the information associated with the default settings of the predetermined function, corresponding to each button, is set (steps S902, S903, and S906), and hence it is possible to display the initial display screen on which the default settings intended by the user are reflected, on the liquid crystal display section 401 (step S1003).

The present invention is not limited to the processes in FIGS. 6 and 7, and the processes in FIGS. 9 and 10. In a case where the image forming apparatus is equipped with both of the customization function and the resume function, one of the customization function and the resume function may be preferentially executed, and further, the settings to be reflected on the screen which is to be resumed by the resume function is not necessarily required to be those of a predetermined function having been used at logout time, but may be settings of a predetermined function used in a screen which is associated with a timing desired by the user.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-206277 filed Oct. 1, 2013, which is hereby incorporated by reference herein in its entirety.

What is claimed is:

1. An image forming apparatus comprising:
a storage device; and
a processor configured to execute computer executable instructions recorded on the storage device, the computer executable instructions including instructions, that when executed by the processor, cause the image forming apparatus to:
display an initial display screen-setting dialog that prompts a user to select a type of screen, from among a plurality of types of screens displayed as part of the initial display screen-setting dialog, corresponding to an initial screen to be displayed after start or reactivation of the image forming apparatus, the selection made by the user being received via the initial display screen-setting dialog and before the start or reactivation of the image forming apparatus, and the plurality of types of screens including at least one user-customizable type screen and a timing type screen; and
display the initial screen after the start or reactivation of the image forming apparatus, based on the selection made by the user via the initial display screen-setting dialog.

2. The image forming apparatus according to claim 1, wherein the computer executable instructions further include instructions, that when executed by the processor, cause the image forming apparatus to store, when the display of the user-customizable type screen is selected, information on the user-customizable type screen in a storage unit medium, and to store, when the display of the timing type screen is selected, information on a screen displayed when the user logs out in the storage medium according to logout of the user.

3. The image forming apparatus according to claim 2, wherein the image forming apparatus is caused to display the initial screen based on the information stored in the storage medium.

4. The image forming apparatus according to claim 1, wherein the user-customizable type screen is a menu screen or a copy screen.

5. The image forming apparatus according to claim 2, wherein the computer executable instructions further include instructions, that when executed by the processor, cause the image forming apparatus to acquire authentication information by performing user authentication, and
wherein the information stored in the storage medium is associated with the acquired authentication information.

6. The image forming apparatus according to claim 1, wherein the computer executable instructions further include instructions, that when executed by the processor, cause the image forming apparatus to further prompt the user to select whether to use setting values registered by the user or setting values at logout time, as initial setting values to be set for the initial screen.

7. A method of controlling an image forming apparatus comprising:
displaying an initial display screen-setting dialog that prompts a user to select a type of screen, from among a plurality of types of screens displayed as part of the initial display screen-setting dialog, corresponding to an initial screen to be displayed after start or reactivation of the image forming apparatus, the selection made by the user being received via the initial display screen-setting dialog and before the start or reactivation of the image forming apparatus, and the plurality of types of screens including at least one user-customizable type screen and a timing type screen; and
displaying the initial screen after the start or reactivation of the image forming apparatus, based on the selection made by the user via the initial display screen-setting dialog.

8. A non-transitory computer-readable storage medium storing a computer-executable program for executing a method of controlling an image forming apparatus,
wherein the method comprises:
displaying an initial display screen-setting dialog that prompts a user to select a type of screen, from among a plurality of types of screens displayed as part of the initial display screen-setting dialog, corresponding to an initial screen to be displayed after start or reactivation of the image forming apparatus, the selection made by the user being received via the initial display screen-setting dialog and before the start or reactivation of the image forming apparatus, and the plurality of types of screens including at least one user-customizable type screen and a timing type screen; and
displaying the initial screen after the start or reactivation of the image forming apparatus, based on the selection made by the user via the initial display screen-setting dialog.

9. The image forming apparatus according to claim 1, further comprising a storage medium configured to store initial-display-screen information corresponding to the selection made by the user,
wherein in response to the user logging out, the image forming apparatus is caused to determine whether the initial-display-screen information corresponds to the timing type screen.

10. The image forming apparatus according to claim 9, wherein the computer executable instructions further include instructions, that when executed by the processor, cause the image forming apparatus to store, in response to a determination that the initial-display-screen information corresponds to the timing type screen, setting information corresponding to a screen being displayed at the time of the user logging out.

* * * * *